Figure 1A:
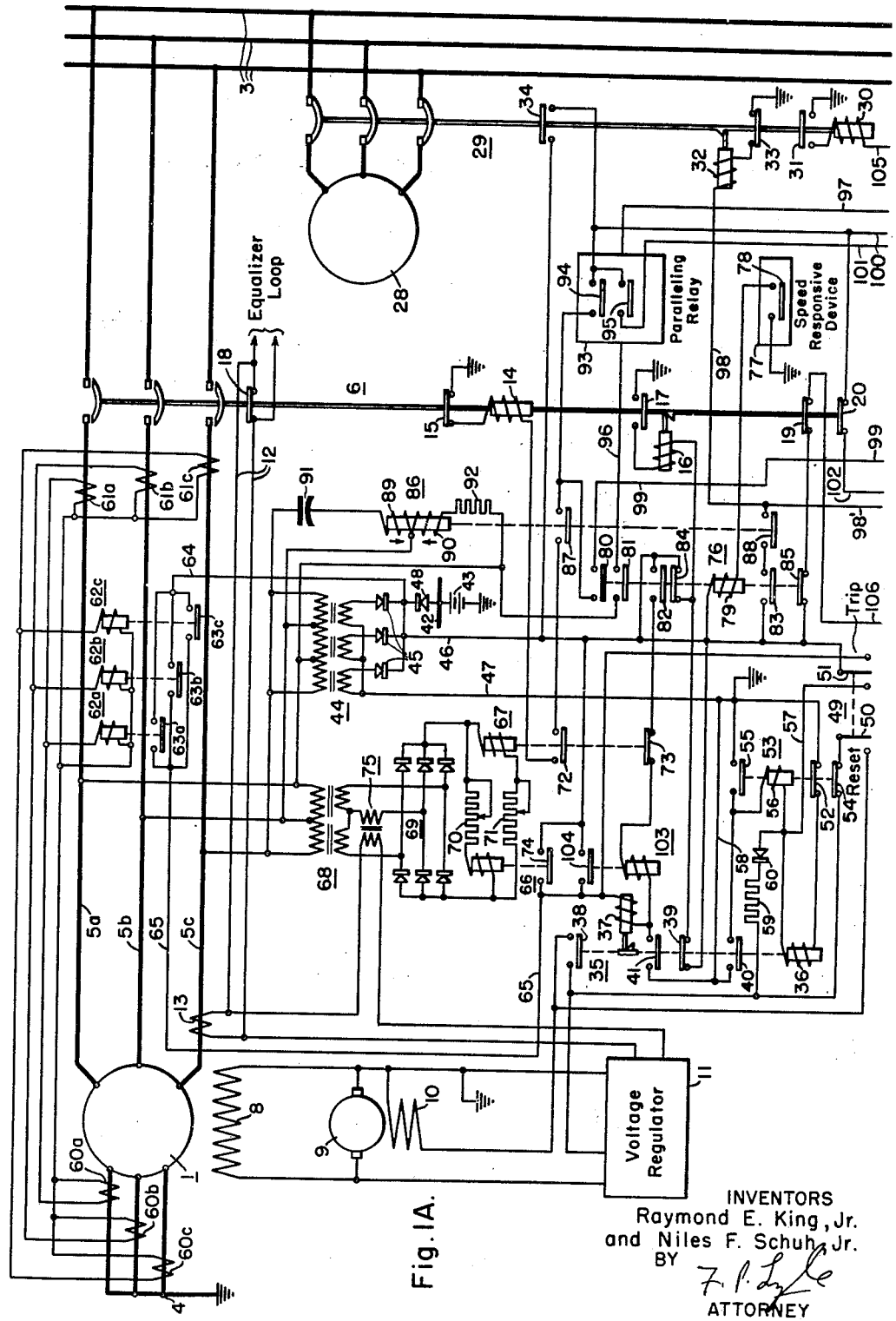

June 24, 1958  R. E. KING, JR., ET AL  2,840,725
ALTERNATING CURRENT GENERATOR SYSTEM
Filed April 12, 1955  2 Sheets-Sheet 1

INVENTORS
Raymond E. King, Jr.
and Niles F. Schuh, Jr.
BY
ATTORNEY

United States Patent Office 2,840,725
Patented June 24, 1958

2,840,725

ALTERNATING CURRENT GENERATOR SYSTEM

Raymond E. King, Jr., and Niles F. Schuh, Jr., Lima, Ohio, assignors to Westinghouse Electric Corporation, East Pittsburgh, Pa., a corporation of Pennsylvania Application April 12, 1955, Serial No. 500,774

20 Claims. (Cl. 307—87)

The present invention relates to alternating current generator systems, and more particularly to an automatic system for the control and protection of alternating current generators operating in parallel.

The invention is especially suitable for use in multigenerator alternating current electric power supply systems for aircraft, although it will be obvious that its usefulness is not necessarily limited to this specific application. Alternating current electrical systems are being used to an increasing extent on aircraft. Such systems consist of a plurality of alternating current generators, usually driven by the main engines of the airplane, and connected in parallel to a load bus which supplies a distribution system to which the various electrical loads on the airplane are connected. The introduction and development of alternating current systems, together with the increasing demands on the electrical systems of modern aircraft, has increased the complexity of such systems to the extent that their operation has become very burdensome on airplane flight crews because of the numerous indicating and control devices which require attention both during normal operation and under fault conditions.

An adequate and uninterrupted supply of electrical energy is necessary to the safe operation of modern aircraft, and it is essential, therefore, that the electrical system must have the highest degree of reliability. This requires the provision of positive and reliable means for removing a generator from the bus and deenergizing its field winding upon the occurrence of a fault, or other abnormal condition, in order to prevent damage to other generators in the system or to the loads, and to minimize damage to the faulty generator itself. These requirements of reliability and protection without interrupting the continuity of the power supply have contributed substantially to the increased complexity of the control and protective systems required.

There is a great need, therefore, for completely automatic operation of the electrical power system, in order to relieve the flight crew of the necessity of constant attention so that they will be free for other duties. Such an automatic system must be capable of automatically paralleling the generators on the load bus, and must include the necessary control and protective features to give reliable operation and protection without interrupting the continuity of power supply. It is frequently also desirable to provide for an auxiliary supply of power to the bus from an auxiliary source, such as a ground power supply or an emergency generator on the airplane itself, and the electrical system should preferably also provide for automatically connecting the auxiliary power source when required.

The principal object of the present invention is to provide a completely automatic control and protective system for a plurality of alternating current generators connected to a common load bus for operation in parallel.

Another object of the invention is to provide a control system for a plurality of alternating current generators which will automatically energize the generators and connect them to the bus in parallel when they are properly synchronized to permit parallel operation, and which will prevent paralleling the generators when the conditions are not correct, and which also includes reliable and positive protective means for disconnecting a faulty generator from the bus without affecting the other generators which may be connected to the bus.

A further object of the invention is to provide a completely automatic control and protective system for a plurality of alternating current generators which also includes means for automatically connecting an auxiliary power source to the bus when all the main generators have been disconnected from the bus, and for disconnecting the auxiliary power source when any one or more of the main generators are ready to be connected to the bus.

A still further object of the invention is to provide a completely automatic system for the control and protection of a plurality of alternating current generators, particularly for aircraft use, which requires no attention from the time the engines which drive the generators are started until they are shut down after a flight, the control system automatically connecting the generators and disconnecting them as required, and the system also including protective means for positively and reliably removing a faulty generator, or an over or under-excited generator, from the bus before it can cause any damage to the system or to the connected loads and without interrupting the power supply.

Figure 1B:
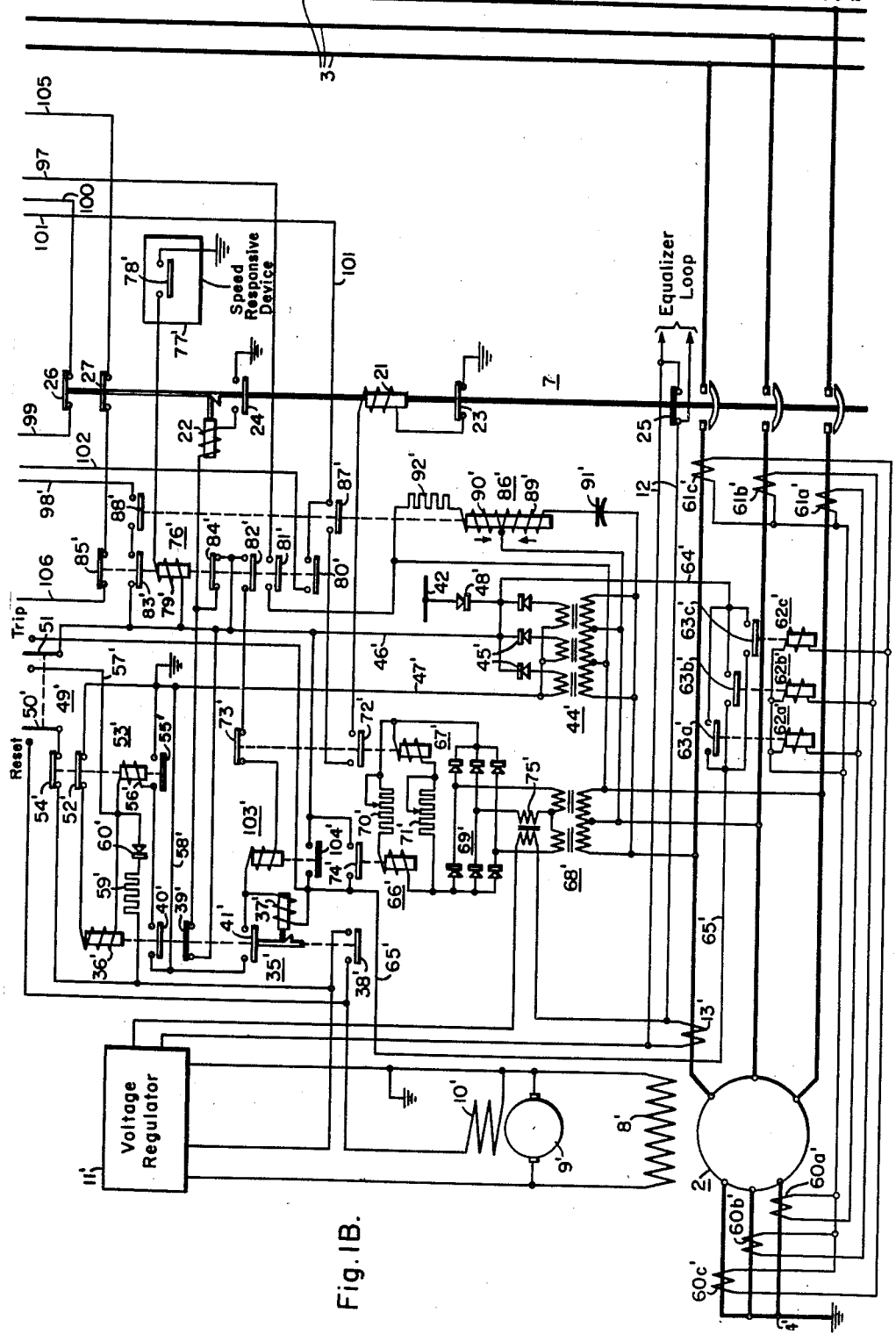

Other objects and advantages of the invention will be apparent from the following detailed description, taken in connection with the accompanying drawing, in which:

Figures 1A and 1B, taken together, show a schematic diagram of a preferred embodiment of the invention.

The drawing shows the invention applied to a two-generator system, although it will be obvious that it could be applied to systems having any number of generators operating in parallel. The system shown in the drawing includes two main generators 1 and 2 connected in parallel to a load bus 3. The generators 1 and 2 may be any type of alternating current generators and may be of any suitable physical construction. The generators may be driven by any suitable prime movers (not shown), such as the main engines of an airplane. The generators 1 and 2 are shown as being three-phase generators with the windings connected to an external grounded neutral point 4. The other ends of the phase windings of the generators are connected to leads 5a, 5b and 5c for connection to the load bus 3. The generator 1 is connected to the bus 3 by a circuit breaker 6 of any suitable type and the generator 2 is connected to the bus by a similar circuit breaker 7.

The generators 1 and 2 have field windings 8 and 8', respectively. The field windings are excited by exciters 9 and 9' which may be integral with their respective generators and which may be of any suitable type. The exciters are shown as direct current generators having their armatures connected directly to the respective generator field windings, and having self-excited shunt field windings 10 and 10', respectively, connected across the exciter armatures. The negative terminals of the exciters are preferably connected to ground, as shown. It will be understood that any suitable type of exciter or excitation system may be used to supply the excitation of the main generators 1 and 2, and the generator voltages are controlled by voltage regulators 11 and 11', respectively, which control the exciter field excitation and thus the generator voltage. The regulators may be any suitable type of regulator which senses the output voltage of the corresponding main generator and controls the excitation accordingly to maintain constant generator output voltage. The regulators have not been shown in detail to avoid unnecessary complication of the drawing, since they are not a part of the invention. Proper division of reactive load between the generators, when they are operating in parallel, is obtained in a usual manner by means of an equalizer loop 12 supplied from current transformers 13 and 13' energized in response to the output currents of the respective generators and having their secondary windings connected in the loop circuit 12. The regulators are connected to the loop circuit, as shown, so that their action is modified by currents circulating in the loop in a manner to maintain proper division of reactive load.

The circuit breakers 6 and 7 which connect the generators 1 and 2 to the load bus may be of any suitable type. The breaker 6 is shown as having a closing coil 14 which actuates the breaker to closed position when the coil is energized, and which is connected through an auxiliary contact 15 which is closed when the breaker is open. The breaker 6 also has a trip coil 16 which releases a latching mechanism to allow the breaker to open when the coil is energized, the coil being connected through an auxiliary contact 17 which is closed when the breaker is closed. The circuit breaker 6 also has an interlock contact 18, which closes when the breaker is open to short out the current transformer 13 and thus remove it from the equalizer loop upon opening of the circuit breaker. The breaker 6 also has interlock contacts 19 and 20 which are closed when the breaker is open. The circuit breaker 7 may be similar to the circuit breaker 6 and has a closing coil 21 and a trip coil 22 connected through auxiliary contacts 23 and 24, respectively. The breaker 7 also has an interlock contact 25, for the same purpose as the contact 18 of the breaker 6, and has interlock contacts 26 and 27 which are closed when the breaker is open.

An auxiliary generator 28 is also shown, with a circuit breaker 29 for connecting the auxiliary generator 28 to the bus 3. It will be understood that it is frequently desirable to have an auxiliary source of power connected to the bus 3 to permit limited operation of electrical equipment on the airplane when the main generators 1 and 2 are not in operation, such as when the plane is on the ground with the engines stopped or running at idling speed, or under emergency conditions. The generator 28, therefore, is to be taken as representing any auxiliary power source, such as a ground power supply which may be connected to the plane through a separable connector, or an emergency generator on the plane itself for providing a limited power supply if all the main generators are out of operation for any reason.

The auxiliary generator 28 is connected to the bus 3 by the circuit breaker 29 which is controlled, as described hereinafter, to connect the generator 28 to the bus when both generators 1 and 2 are disconnected and to disconnect the generator 28 from the bus when either one or both of the generators 1 and 2 are ready to be connected to the bus. The circuit breaker 29 may be of any suitable type and has a closing coil 30 connected through an auxiliary contact 31 which is open when the breaker is closed, and a trip coil 32 connected through an auxiliary contact 33 which is closed when the breaker is closed. The breaker 29 also has an interlock contact 34 which is open when the breaker is closed.

Each of the generators 1 and 2 is provided with a control and protective system. These systems are shown as being identical for both generators and the system of the generator 1 will be described in detail. The control and protective system of the generator 2 is exactly the same and the same reference numerals are used for corresponding elements of the system, primed numerals being used for the system of the generator 2. The control and protective system of each generator includes manual means for controlling the initial excitation of the generator, and control and protective means for automatically controlling the operation.

The excitation control means and certain of the protective features may be similar to those disclosed and claimed in a copending application of B. O. Austin et al., Serial No. 451,019, filed August 19, 1954. The generator field excitation is controlled by a generator control relay 35. The relay 35 is shown as being a latch type relay having a closing coil 36 which actuates the relay to closed position, and having a trip coil 37 which releases a suitable latching mechanism, when energized, to cause the relay to return to open position. The control relay 35 has a contact 38 which is connected in series in the circuit of the exciter field winding 10. The relay 35 also has a normally closed contact 39 connected in series with the trip coil 16 of the circuit breaker 6, and has a normally open contact 40 and an auxiliary contact 41 which is connected to interrupt the circuit of the trip coil 37 when the relay opens.

The closing and trip coils of the generator control relay 35, as well as certain other relays and control devices, are preferably designed to be energized by direct current. Direct current for this purpose is supplied from an external source of direct current, such as a direct current bus 42 which may be supplied from any suitable direct current source, shown diagrammatically as a battery 43 having its positive terminal connected to the bus and its negative terminal connected to ground. It will be understood that most modern aircraft have an auxiliary direct current system in addition to a main alternating current electrical system, so that a direct current bus is normally available. The bus 42, however, is to be taken as representing any suitable source of direct current external to the alternating current system itself. In order to obtain a high degree of reliability and to prevent any failure of the system to operate in case of a loss of the direct current bus 42, a direct current supply is also provided from the output of the generator by means of a transformer and rectifier. This may be of any suitable type and is shown as including a three-phase transformer 44 connected across the generator output voltage, with rectifiers 45 connected to rectify the secondary output of the transformer 44. The rectifiers 45 are shown as being connected in Y to a conductor 46, the other sides of the secondaries of the transformer 44 being connected to ground by a conductor 47. The direct current bus 42 is also connected to the conductor 46 through a blocking rectifier 48.

A manual switch 49 is provided for controlling the control relay 35. The switch 49 is shown as a two-pole switch having an off position, shown in the drawing, and having a reset position, to the left in the drawing, and a trip position, to the right in the drawing. The switch 49 is preferably of the momentary contact type in both positions, so that it will return to the off position when released. The contact 50 of the switch 49, in the reset position, completes a bypass circuit in parallel with the contact 38 of the generator control relay 35, to complete the exciter field circuit and permit excitation of the generator 1 even if the control relay 35 does not immediately close. The switch contact 51, in the reset position, completes a circuit from the direct current conductor 46 to the closing coil 36 of the control relay 35, the circuit extending from the coil 36 to ground through a normally closed contact 52 of a lockout relay 53. The lockout relay also has another normally closed contact 54 in the circuit of the switch contact 50 and has a normally open sealing contact 55. The operating coil 56 of the lockout relay 53 is connected to be energized from the switch contact 51 through conductor 57, relay contact 40 and conductor 58 to ground. A field flashing resistor 59 is also connected to the direct current conductor 46 through switch contact 51, in the reset position, preferably through a blocking rectifier 60, to flash the exciter field with direct current of the proper polarity when the switch 49 is placed in the reset position, to insure proper build-up of the exciter voltage.

It will be seen that when the switch 49 is moved to the reset position, the generator control relay 35 is actuated to closed position, by energization of the coil 36 through the switch contact 51, and latches in that position, completing the exciter field circuit through the contact 38. The lockout relay 53 is energized through the relay contact 40 when the relay 35 closes, and opens its contacts 52 and 54, being held open by the sealing contact 55 as long as the switch 49 is in the reset position. The purpose of this relay is to prevent cycling or pumping of the relay 35 if the switch 49 is placed on the reset position during a fault, or is held there under fault conditions, since the lockout relay contact 52 interrupts the circuit of the closing coil 36 to prevent cycling of the relay after it has once tripped on a fault, as more fully explained in the above-mentioned Austin et al. application. The connection of the exciter field circuit through the switch contact 50 permits the exciter 9 to build up from its residual voltage, irrespective of the position of the relay 35, in case the direct current bus 42 fails to supply the necessary energizing current for closing the relay, for any reason. The exciter can thus build up and energize the generator field 8 even though the relay 35 remains open until the generator output has increased sufficiently to energize the relay through the transformer 44 and rectifiers 45, so that loss of the D. C. bus does not prevent initially exciting the generator.

Protection against faults in the generator 1, or on any of the generator leads, is provided by a differential protective relay means. The fault protective means includes a set of current transformers 60a, 60b and 60c connected to respond, respectively, to the currents in the neutral leads of the generator phase windings, and a set of current transformers 61a, 61b and 61c, connected to respond, respectively, to the currents in the generator leads 5a, 5b and 5c. The secondary windings of the corresponding transformers of the two sets of current transformers are connected together in series, as shown, and to the operating coils of three differential protective relays 62a, 62b and 62c. The three differential protective relays have contacts 63a, 63b and 63c which are connected in parallel to complete an energizing circuit from the direct current conductor 46 through conductors 64 and 65 to the trip coil 37 of the control relay 35, the other end of the coil being connected to ground through the relay contact 41 and conductor 58. It will be understood that under normal conditions there will be no difference in the secondary currents of the current transformers and the protective relays will not be energized. Upon the occurrence of a fault in the generator, however, or on one or more of the generator leads in the protected zone between the two sets of current transformers, the currents will become unbalanced on opposite sides of the fault in the phase or phases affected, and the difference in the secondary currents of the corresponding current transformers will cause operation of one or more of the relays 62a, 62b and 62c to trip the relay 35.

Protection against overvoltage or overexcitation of the generator 1 is provided by an overvoltage relay 66, and protection against undervoltage or underexcitation of the generator 1 is provided by an undervoltage relay 67. The relays 66 and 67 may have their operating coils connected to respond to the output voltage of the generator 1 in any suitable manner. As shown, the operating coils are connected in parallel to the generator voltage through a three-phase transformer 68 and a rectifier bridge 69, so that the relays respond to the average of the three-phase voltages of the generator 1. Adjustable resistors 70 and 71 may be connected in series with the relay coils to adjust the voltage settings. The undervoltage relay 67 is adjusted to close its contact 72 and open its contact 73 when the generator voltage exceeds a predetermined value and to drop out when the voltage falls below the desired minimum value for normal operation. The overvoltage relay 66 is set to close its contact 74 when the voltage of the generator exceeds the desired maximum value.

Selective operation of the over- and undervoltage protection, when the generators 1 and 2 are operating in parallel, is preferably provided by means of a mutual reactor 75 having one winding connected in the sensing circuit of the voltage relays and having another winding connected to the equalizer loop 12 as shown. As more fully explained in a copending application of R. H. Keith et al., Serial No. 330,510, filed January 9, 1953, now Patent No. 2,717,318, issued September 6, 1955, it can be shown that this arrangement has the effect of biasing the relays so that the relay settings are, in effect, changed in such a manner that the faulty generator is removed from the bus by operation of one or the other of the voltage relays, as described hereinafter, without affecting the good generator or generators.

The generator 1 is also provided with an underspeed relay 76 which is controlled by a speed responsive device 77 actuated by the generator prime mover, or in any other manner to respond to the generator speed. The speed responsive device 77 may be a centrifugal device, or any other suitable type of device, which will close its contact 78 when the generator reaches a predetermined speed. The contact 78 is connected to the operating coil 79 of the underspeed relay 76 so that the coil is energized when the generator reaches the predetermined speed, the contact 78 completing a circuit for the coil 79 from the direct current conductor 46 to ground. The underspeed relay 76 has normally open contacts 80, 81, 82 and 83 and has normally closed contacts 84 and 85 connected as shown.

The generator 1 is also provided with a phase sequence relay 86. Any suitable type of relay may be used for this purpose which will close its contacts 87 and 88 if the phase sequence of the generator is correct. The particular relay shown in the drawing is of the type disclosed and claimed in a copending application of A. A. Lighty et al., Serial No. 476,118, filed December 20, 1954. This relay has two differentially connected coils 89 and 90 which are connected together and to one phase of the generator 1. The free end of the coil 89 is connected to another phase of the generator through a capacitor 91, and the free end of the coil 90 is connected to the third phase of the generator through a resistor 92. It can be shown, as more fully explained in the above-mentioned application, that the vector relations of the currents in the coils 89 and 90 are such that the relay will close its contacts when the generator has a predetermined phase sequence, but will not operate if the phase sequence is incorrect or if there is an open phase lead.

A paralleling relay 93 is also provided to control the connection of the generators to the bus for parallel operation. Any suitable type of paralleling relay may be used which will operate to close its contacts when the generators are sufficiently close to synchronism to permit paralleling. A suitable type of relay for this purpose is shown, for example, in the copending application of R. V. Rice, Serial No. 518,780, filed June 29, 1955. This relay is provided with two contacts 94 and 95 and responds to the differences in voltage, frequency and phase angle of the two generators to close its contacts when the differences of these quantities are within predetermined limits which will permit paralleling of the generators. The relay is shown as being connected to one phase of the generator 1 through a conductor 96 and contact 81 of the underspeed relay 76, and to the corresponding phase of the generator 2 through a conductor 97 and contact 81' of the underspeed relay 76'. Thus, when both of the underspeed relays 76 and 76' have operated, the paralleling relay 93 is connected to the two generators and will close its contacts 94 and 95 when the correct conditions for paralleling the generators are attained.

The operation of this system may be described as follows. If neither of the generators 1 or 2 is in operation, the positions of the various relays will be as shown in the drawing, with the circuit breakers 6 and 7 open so that the generators are disconnected from the bus 3. Under these conditions, the circuit breaker 29 will be closed, as shown, to connect the auxiliary generator 28 to the bus so that a supply of auxiliary or emergency power is available. If it is now desired to start up the main generators 1 and 2 and connect them to the bus, the manual switches 49 and 49' are actuated to the reset position, either before or after the prime movers of the generators have been started. This is the only manual operation required, and the subsequent operation of the system is completely automatic and needs no attention from an operator. When the manual switches 49 and 49' are placed in the reset position, the generator control relays 35 and 35' are actuated to closed position, as described above, and the excitation circuits of the generators are thus completed so that the generators can build up their voltages as they are brought up to speed. As each generator comes up to speed, its underspeed relay 76 or 76' is actuated when the minimum operating speed is reached, by operation of the speed responsive devices 77 and 77'.

It will be understood that both generators will not usually reach operating speed at exactly the same time, but one will reach its normal speed and voltage slightly ahead of the other. Assume that generator 1 first reaches normal operating conditions. If the phase sequence of the generator is correct, the phase sequence relay 86 closes its contacts 87 and 88 as the generator voltage comes up, and when the underspeed relay 76 operates, a circuit is completed from the direct current conductor 46 through the underspeed relay contact 83, phase sequence relay contact 88 and conductor 98 to the trip coil 32 of the circuit breaker 29. The circuit breaker 29 is thus opened to disconnect the auxiliary generator 28 from the bus 3 in preparation for connecting the main generator 1.

As the generator voltage comes up, the undervoltage relay 67 operates when the voltage reaches its minimum normal value and closes its contacts 72 and opens the contact 73. When the contact 72 closes, a circuit is completed from the closing coil 14 of the circuit breaker 6 through relay contact 72, contact 87 of the phase sequence relay, contact 80 of the underspeed relay 76, conductor 99, interlock contact 26 of circuit breaker 7, conductor 100, and closed interlock contact 34 of circuit breaker 29 to the direct current conductor 46. The closing coil 14 is thus energized and closes the breaker 6 to connect the generator 1 to the bus 3, simultaneously opening the interlock contacts 19 and 20. Thus, the generator 1 is automatically connected to the bus when it is ready for operation, independently of the paralleling relay 93, if the circuit breaker 7 is still open with its interlock contact 26 closed.

As the generator 2 now comes up to speed, its underspeed relay 76', phase sequence relay 86', and undervoltage relay 67' operate in the same manner. When all three of these relays have operated, a circuit is prepared from the closing coil 21 of the circuit breaker 7 through undervoltage relay contact 72', phase sequence relay contact 87', conductor 101, paralleling relay contact 95 and closed interlock contact 34 to the direct current conductor 46. When the voltage, frequency and phase angle differences between the two generators are within the predetermined limits to permit paralleling, the relay 93 closes its contact 95 and completes the circuit for the closing coil 21 of the circuit breaker 7, so that the breaker closes and connects generator 2 to the bus 3 in parallel with generator 1.

The system is so arranged that either one of the generators may be first connected to the bus by operation of its relays, and the second generator will then be connected under control of the paralleling relay 93. Thus, if the generator 2 had first reached normal speed and voltage, the relay 76' would close first, and upon closing of the phase sequence relay 86' and undervoltage relay 67', the closing coil 21 would be energized through the contact 72', contact 87', underspeed relay contact 80', conductor 102, interlock contact 20, conductor 100, and interlock contact 34 to the conductor 46 so that the breaker 7 would be closed. Closing of the breaker 7 and opening of its interlock contact 26, would then require the closing coil 14 of the breaker 6 to be energized under control of the paralleling relay 93 through a circuit extending from the coil 14 through undervoltage relay contact 72, phase sequence relay contact 87, paralleling relay contact 94, and interlock contact 34 to the direct current conductor 46. Thus, it will be seen that the energizing circuit for each circuit breaker closing coil includes two parallel branches, one containing an underspeed relay contact and an interlock contact of the other breaker, and the other parallel branch containing a contact of the paralleling relay. The circuit arrangement is such, therefore, that either generator may be connected to the bus first and the breaker of the other generator can then be closed only under control of the paralleling relay to connect the generator to the bus when the conditions are correct for paralleling the generators.

When both generators are connected to the bus, the system is in its normal operating condition. Upon the occurrence of a fault in the generator 1, or on any of the generator leads within the protected zone between the differential current transformers, the corresponding differential relay or relays will close the contacts 63a, 63b or 63c, completing a circuit from the direct current conductor 46 through conductors 64 and 65 to the trip coil 37 of the control relay 35. Similarly, if an overvoltage or overexcitation condition occurs on the generator, the overvoltage relay 66 will close its contact 74, completing a circuit from the direct current conductor 46 to the trip coil 37. If an undervoltage or underexcitation condition occurs, the undervoltage relay 67 will drop out, closing its contact 73 which completes an energizing circuit from the direct current conductor 46 through underspeed relay contact 82 to a time delay relay 103. The time delay relay 103 may be of any suitable type, such as a thermal relay, providing a predetermined time delay, and after the predetermined time, if the undervoltage condition still exists, it closes its contact 104, completing an energizing circuit to the trip coil 37.

Thus, under fault or over- or undervoltage conditions the trip coil 37 is energized and trips the control relay 35. This interrupts the exciter field circuit by opening the contacts 38, and completes a circuit from the direct current conductor 46 through control relay contact 39 to the trip coil 16 of the circuit breaker 6, tripping the breaker and disconnecting the generator from the bus 3. The circuit breaker 7 is tripped in an exactly similar manner by operation of its corresponding relays upon any of the same conditions occurring on the generator 2. Either generator may also be tripped manually at any time, if desired, by placing its manual switch 49 or 49' in the trip position, which completes an energizing circuit to the trip coil 37 of the relay 35. When either of the generators has been disconnected by tripping of the relay 35, it cannot be reconnected to the bus except by manually resetting the control relay 35 by operation of the switch 49 or 49', so that the system is electrically trip free.

On normal shutdown of the system, with the generators operating normally, the generators are automatically tripped from the bus and the auxiliary generator 28 is reconnected. Thus, as the speed of generator 1, for example, decreases, the underspeed relay 76 drops out when the speed of the generator falls below its normal operating range. This completes a circuit from the direct current conductor 46 through relay contact 84 to the circuit breaker trip coil 16, tripping the breaker and disconnecting the generator from the bus, the breaker also closing its interlock contacts 19 and 20. Similarly, when the generator 2 drops below the minimum normal speed, its underspeed relay 76' drops out and a similar circuit is completed through the relay contact 84' to the trip coil 22 of the breaker 7, so that it is tripped and the generator 2 is disconnected from the bus, the breaker closing its interlock contacts 26 and 27.

When both breakers have been tripped in this manner, a circuit is completed from the closing coil 30 of the auxiliary generator circuit breaker 29 through conductor 105, interlock contact 27, underspeed relay contact 85', conductor 106, interlock contact 19 and relay contact 85 to the direct current conductor 46, so that the closing coil 30 is energized and the breaker 29 closes to connect the auxiliary generator 28 to the bus 3. Thus, the system is completely automatic in its operation to disconnect the main generators when their speed falls below the minimum normal speed, and to reconnect the auxiliary generator 28 when both the main generators have been disconnected. It will be noted that when either generator is automatically disconnected in this manner, in the absence of any fault condition, the control relay 35 is not tripped, so that the generator remains in condition to be automatically reconnected as soon as its speed and voltage have again come up to the normal values. The generator voltage will, of course, drop on shutdown and cause operation of the undervoltage relay 67, but this will not cause tripping of the relay 35 on normal shutdown because the underspeed relay contact 82 opens before the time delay relay 103 can operate.

It should now be apparent that a completely automatic control and protective system has been provided for a plurality of alternating current generators operating in parallel which requires no attention or manual operation other than initially operating the switches 49 and 49' to close the excitation circuits and thus select the generators which are to be connected to the bus. After this operation has once been performed, the generators will be connected and disconnected automatically, as described, with no further attention except in case of a fault in one of the generators. A two-generator system has been shown for the purpose of illustration, but it will be obvious that the system described can be equally well applied to systems having more than two generators. A specific embodiment of the invention has been shown and described for the purpose of illustration, but it will be apparent that various other embodiments and modifications are possible within the scope of the invention.

We claim as our invention:

1. A control and protective system for an alternating current generator, said system comprising switch means for connecting said generator to a load bus, relay means responsive to the speed of the generator and having contact means actuated when said speed exceeds a predetermined value, relay means responsive to the phase sequence of the generator and having contact means actuated when the generator has a predetermined phase sequence, relay means responsive to the voltage of the generator and having contact means actuated when said voltage exceeds a predetermined value, the contact means of all three relays being connected in an energizing circuit for said switch means to effect operation of the switch means to connect the generator to the bus when all three contact means are actuated, said speed responsive relay means also including contact means connected to effect operation of the switch means to disconnect the generator from the bus when the generator speed falls below a predetermined value.

2. A control and protective system for an alternating current generator, said system comprising switch means for connecting said generator to a load bus, relay means responsive to the speed of the generator and having contact means actuated when said speed exceeds a predetermined value, relay means responsive to the phase sequence of the generator and having contact means actuated when the generator has a predetermined phase sequence, relay means responsive to the voltage of the generator and having contact means actuated when said voltage exceeds a predetermined value, the contact means of all three relays being connected in an energizing circuit for said switch means to effect operation of the switch means to connect the generator to the bus when all three contact means are actuated, said voltage responsive relay means also including contact means for effecting operation of the switch means to disconnect the generator from the bus when the generator voltage falls below a predetermined value.

3. A control and protective system for an alternating current generator, said system comprising switch means for connecting said generator to a load bus, relay means responsive to the speed of the generator and having contact means actuated when said speed exceeds a predetermined value, relay means responsive to the phase sequence of the generator and having contact means actuated when the generator has a predetermined phase sequence, relay means responsive to the voltage of the generator and having contact means actuated when said voltage exceeds a predetermined value, the contact means of all three relays being connected in an energizing circuit for said switch means to effect operation of the switch means to connect the generator to the bus when all three contact means are actuated, said speed responsive relay means also including contact means connected to effect operation of the switch means to disconnect the generator from the bus when the generator speed falls below a predetermined value, and said voltage responsive relay means also including contact means for effecting operation of the switch means to disconnect the generator from the bus when the generator voltage falls below a predetermined value.

4. A control and protective system for an alternating current generator, said system comprising switch means for connecting said generator to a load bus, relay means responsive to the speed of the generator and having contact means actuated when said speed exceeds a predetermined value, relay means responsive to the phase sequence of the generator and having contact means actuated when the generator has a predetermined phase sequence, relay means responsive to the voltage of the generator and having contact means actuated when said voltage exceeds a predetermined value, the contact means of all three relays being connected in an energizing circuit for said switch means to effect operation of the switch means to connect the generator to the bus when all three contact means are actuated, said speed responsive relay means also including contact means connected to effect operation of the switch means to disconnect the generator from the bus when the generator speed falls below a predetermined value, and said voltage responsive relay means also including contact means for effecting operation of the switch means to disconnect the generator from the bus when the generator voltage falls below a predetermined value, an overvoltage relay responsive to the voltage of the generator and having contact means actuated when the generator voltage exceeds a predetermined value higher than the value which effects operation of the first-mentioned voltage responsive relay means, and fault responsive relay means having contact means actuated in response to a fault in the generator, the contact means of the overvoltage relay and the fault responsive relay means being connected to effect operation of the switch means to disconnect the generator from the bus upon actuation of either of the last-mentioned contact means.

5. In combination, a plurality of alternating current generators, switch means for each generator for connecting the generators to a common load bus, each generator having associated therewith relay means responsive to the generator speed, relay means responsive to the generator voltage and relay means responsive to the phase sequence of the generator, all of said relay means having contact means connected in an energizing circuit for the switch means of the associated generator to effect closing of the switch means when the quantities to which the relay means are responsive have predetermined values, a paralleling relay responsive to the voltage, frequency and phase angle differences between the generators and having contacts connected in the energizing circuits of the switch means to control the operation of the switch means, and means for bypassing the contacts of the paralleling relay when all the switch means are in open position, operation of one of the switch means to closed position effecting removal of the bypass from the paralleling relay contacts in the energizing circuit of the remaining switch means.

6. In combination, a plurality of alternating current generators, switch means for each generator for connecting the generators to a common load bus, each generator having associated therewith relay means responsive to the generator speed, relay means responsive to the generator voltage and relay means responsive to the phase sequence of the generator, all of said relay means having contact means connected in an energizing circuit for the switch means of the associated generator to effect closing of the switch means when the quantities to which the relay means are responsive have predetermined values, a paralleling relay responsive to the voltage, frequency and phase angle differences between the generators and having contacts connected in the energizing circuits of the switch means to control the operation of the switch means, each of the switch means having interlock contacts connected across the paralleling relay contacts in the energizing circuits of the other switch means, said interlock contacts being closed when the corresponding switch means are in open position and open when the switch means are closed.

7. In combination, a plurality of alternating current generators, switch means for each generator for connecting the generators to a common load bus, each generator having associated therewith relay means responsive to the generator speed, relay means responsive to the generator voltage and relay means responsive to the phase sequence of the generator, all of said relay means having contact means connected in an energizing circuit for the switch means of the associated generator to effect closing of the switch means when the quantities to which the relay means are responsive have predetermined values, a paralleling relay responsive to the voltage, frequency and phase angle differences between the generators and having contacts connected in the energizing circuits of the switch means to control the operation of the switch means, and means for bypassing the contacts of the paralleling relay when all the switch means are in open position, operation of one of the switch means to closed position effecting removal of the bypass from the paralleling relay contacts in the energizing circuit of the remaining switch means, the speed responsive relay of each generator also having contact means connected to effect operation of the corresponding switch means to disconnect the generator from the bus when the generator speed falls below a predetermined value.

8. In combination, a plurality of alternating current generators, switch means for each generator for connecting the generators to a common load bus, each generator having associated therewith relay means responsive to the generator speed, relay means responsive to the generator voltage and relay means responsive to the phase sequence of the generator, all of said relay means having contact means connected in an energizing circuit for the switch means of the associated generator to effect closing of the switch means when the quantities to which the relay means are responsive have predetermined values, a paralleling relay responsive to the voltage, frequency and phase angle differences between the generators and having contacts connected in the energizing circuits of the switch means to control the operation of the switch means, and means for bypassing the contacts of the paralleling relay when all the switch means are in open position, operation of one of the switch means to closed position effecting removal of the bypass from the paralleling relay contacts in the energizing circuit of the remaining switch means, the voltage responsive relay of each generator also having contact means connected to effect operation of the corresponding switch means to disconnect the generator from the bus when the generator voltage falls below a predetermined value.

9. In combination, a plurality of alternating current generators, switch means for each generator for connecting the generators to a common load bus, each generator having associated therewith relay means responsive to the generator speed, relay means responsive to the generator voltage and relay means responsive to the phase sequence of the generator, all of said relay means having contact means connected in an energizing circuit for the switch means of the associated generator to effect closing of the switch means when the quantities to which the relay means are responsive have predetermined values, a paralleling relay responsive to the voltage, frequency and phase angle differences between the generators and having contacts connected in the energizing circuits of the switch means to control the operation of the switch means, and means for bypassing the contacts of the paralleling relay when all the switch means are in open position, operation of one of the switch means to closed position effecting removal of the bypass from the paralleling relay contacts in the energizing circuit of the remaining switch means, the speed responsive relay of each generator also having contact means connected to effect operation of the corresponding switch means to disconnect the generator from the bus when the generator speed falls below a predetermined value, and the voltage responsive relay of each generator also having contact means connected to effect operation of the corresponding switch means after a predetermined time delay to disconnect the generator from the bus when the generator voltage falls below a predetermined value.

10. In combination, a plurality of alternating current generators, switch means for each generator for connecting the generators to a common load bus, control means for each of the switch means for effecting operation of the switch means to connect the generators to the bus and to disconnect them therefrom, an auxiliary switch means for connecting an auxiliary power source to the bus, and means for effecting actuation of the auxiliary switch means to closed position when all of the first-mentioned switch means are in open position and for effecting actuation of the auxiliary switch means to open position when any one of the first-mentioned switch means is in closed position.

11. In combination, a plurality of alternating current generators, switch means for each generator for connecting the generators to a common load bus, control means for each of the switch means for effecting operation of the switch means to connect the generators to the bus and to disconnect them therefrom, an auxiliary switch means for connecting an auxiliary power source to the bus, said control means including means for effecting actuation of the auxiliary switch means to closed position upon operation of all the first-mentioned switch means to open position, and the control means also including means for effecting actuation of the auxiliary switch means to open position upon operation of the control means to actuate any one of the first-mentioned switch means to closed position.

12. In combination, a plurality of alternating current generators, switch means for each generator for connecting the generators to a common load bus, each generator having associated therewith relay means responsive to the generator speed, relay means responsive to the generator voltage and relay means responsive to the phase sequence of the generator, all of said relay means having contact means connected in an energizing circuit for the switch means of the associated generator to effect closing of the switch means when the quantities to which the relay means are responsive have predetermined values, an auxiliary switch means for connecting an auxiliary power source to the bus, means for actuating the auxiliary switch means to closed position in response to operation of all the first-mentioned switch means to open position, and means for actuating the auxiliary switch means to open position in response to operation of the speed responsive relay means and phase sequence responsive relay means of any one of the generators to position to effect closing of the corresponding one of the first-mentioned switch means.

13. In combination, a plurality of alternating current generators, switch means for each generator for connecting the generators to a common load bus, each generator having associated therewith relay means responsive to the generator speed, relay means responsive to the generator voltage and relay means responsive to the phase sequence of the generator, all of said relay means having contact means connected in an energizing circuit for the switch means of the associated generator to effect closing of the switch means when the quantities to which the relay means are responsive have predetermined values, an auxiliary switch means for connecting an auxiliary power source to the bus, each of the first-mentioned switch means having interlock contacts connected in an energizing circuit for the auxiliary switch means to effect actuation of the auxiliary switch means to closed position when all of the first-mentioned switch means are in open position, and the speed responsive relay means and phase sequence responsive relay means of each generator having contact means connected in an energizing circuit for the auxiliary switch means to effect actuation of the auxiliary switch means to open position upon operation of said relay means of any one of the generators to position to effect closing of the corresponding one of the first-mentioned switch means.

14. In combination, a plurality of alternating current generators, switch means for each generator for connecting the generators to a common load bus, each generator having associated therewith relay means responsive to the generator speed, relay means responsive to the generator voltage and relay means responsive to the phase sequence of the generator, all of said relay means having contact means connected in an energizing circuit for the switch means of the associated generator to effect closing of the switch means when the quantities to which the relay means are responsive have predetermined values, an auxiliary switch means for connecting an auxiliary power source to the bus, said auxiliary switch means having a closing coil for actuating the auxiliary switch means to closed position and having a trip coil for actuating the auxiliary switch means to open position, each of the first-mentioned switch means having an interlock contact which is closed when its switch means is in open position, all of said interlock contacts being connected in series in an energizing circuit for said closing coil and the speed responsive relay means of all the generators having contact means connected in said energizing circuit to effect energization of the closing coil when all the first-mentioned switch means are in open position, and the speed responsive relay means and phase sequence relay means of each generator having contact means connected in parallel with the corresponding relay contact means of the other generators in an energizing circuit for said trip coil to effect opening of the auxiliary switch means in response to operation of the speed responsive and phase sequence responsive relay means of any one of the generators to position to effect closing of the corresponding one of the first-mentioned switch means.

15. In combination, a plurality of alternating current generators, switch means for each generator for connecting the generators to a common load bus, each generator having associated therewith relay means responsive to the generator speed, relay means responsive to the generator voltage and relay means responsive to the phase sequence of the generator, all of said relay means having contact means connected in an energizing circuit for the switch means of the associated generator to effect closing of the switch means when the quantities to which the relay means are responsive have predetermined values, a paralleling relay responsive to the voltage, frequency and phase angle differences between the generators and having contacts connected in the energizing circuits of the switch means to control the operation of the switch means, and means for bypassing the contacts of the paralleling relay when all the switch means are in open position, operation of one of the switch means to closed position effecting removal of the bypass from the paralleling relay contacts in the energizing circuit of the remaining switch means, an auxiliary switch means for connecting an auxiliary power source to the bus, and means for effecting actuation of the auxiliary switch means to closed position when all of the first-mentioned switch means are in open position and for effecting actuation of the auxiliary switch means to open position when any one of the first-mentioned switch means is in closed position.

16. A control system for an alternating current generator, said system comprising switch means for connecting said generator to a load bus, relay means controlled in response to the speed of the generator and having contact means actuated when said speed exceeds a predetermined value, and relay means responsive to the voltage of the generator and having contact means actuated when said voltage exceeds a predetermined value, both said contact means being connected in an energizing circuit for said switch means to effect operation of the switch means to connect the generator to the bus when both contact means are actuated, said voltage responsive relay means also having contact means connected to effect operation of the switch means after a time delay to disconnect the generator from the bus when the generator voltage falls below a predetermined value.

17. In combination, a plurality of alternating current generators, switch means for each generator for connecting the generators to a common load bus, relay means for each of the generators connected to control an energizing circuit for the corresponding switch means, the relay means being adapted to effect closing of the switch means when the speed and voltage of the generator exceed predetermined values, a paralleling relay responsive to the voltage, frequency and phase angle differences between the generators and connected to control the energizing circuits of the switch means, and means for permitting completion of any one of said energizing circuits independently of the paralleling relay when all the switch means are in open position.

18. In combination, a plurality of alternating current generators, switch means for each generator for connecting the generators to a common load bus, relay means for each of the generators connected to control an energizing circuit for the corresponding switch means, the relay means being adapted to effect closing of the switch means when the speed and voltage of the generator exceed predetermined values, a paralleling relay responsive to the voltage, frequency and phase angle differences between the generators and connected to control the energizing circuits of the switch means, and means for bypassing the paralleling relay when all the switch means are in open position, operation of any one of the switch means removing the bypass to render the paralleling relay effective to control the energizing circuits of the remaining switch means.

19. In combination, a plurality of alternating current generators, switch means for each generator for connecting the generators to a common load bus, control means for each generator including means for effecting actuation of the corresponding switch means to closed position upon the occurrence of predetermined operating conditions of the generator, a paralleling relay responsive to the voltage, frequency and phase angle differences between the generators and connected to control the operation of the switch means, and means for permitting actuation of any one of the switch means to closed position by the corresponding control means independently of the paralleling relay when all the switch means are in open position.

20. In combination, a plurality of alternating current generators, switch means for each generator for connecting the generators to a common load bus, control means for each generator including means for effecting actuation of the corresponding switch means to closed position upon the occurrence of predetermined operating conditions of the generator, a paralleling relay responsive to the voltage, frequency and phase angle differences between the generators and connected to control the operation of the switch means, and means for bypassing the paralleling relay when all the switch means are in open position, operation of any one of the switch means to closed position removing the bypass to render the paralleling relay effective to control the operation of the remaining switch means.

References Cited in the file of this patent

UNITED STATES PATENTS

| | | |
|---|---|---|
| 2,121,594 | Harrison | June 21, 1938 |
| 2,385,181 | Anderson | Sept. 18, 1945 |
| 2,392,469 | Exner | Jan. 8, 1946 |
| 2,689,919 | Lytle | Sept. 21, 1954 |